July 2, 1957 J. E. LASCHENSKI 2,797,583
MOTION CONVERTER
Filed Sept. 27, 1955 2 Sheets-Sheet 1

INVENTOR.
JOSEPH E. LASCHENSKI
BY
Carl H. Lynnestvedt
AGENT

July 2, 1957 J. E. LASCHENSKI 2,797,583

MOTION CONVERTER

Filed Sept. 27, 1955 2 Sheets-Sheet 2

INVENTOR.
JOSEPH E. LASCHENSKI
BY
Carl K. Synnestvedt
AGENT

United States Patent Office 2,797,583

Patented July 2, 1957

2,797,583
MOTION CONVERTER

Joseph E. Laschenski, Philadelphia, Pa., assignor to Philco Corporation, Philadelphia, Pa., a corporation of Pennsylvania Application September 27, 1955, Serial No. 536,944
5 Claims. (Cl. 74—10.85)

This invention relates to motion converters particularly for reciprocatory drive apparatus, while being of broader applicability, the invention is especially concerned with drive means adapted for use in radio equipment, for example, in the tuning device of an automobile radio receiver. With more particularity, the invention relates to tuners which can be reciprocated by manually turning a knob or the like and which can be shifted uni-directionally by automatic motor operation with push button control or the like. It is often usual to provide optional automatic or manual operation, for instance in order to insure maximum convenience for persons who use a radio while driving a car.

Difficulties have arisen in connection with certain operations of the selective manual-automatic control of such a tuner or motion converter. For manual operation, it is usually necessary to provide the possibility of turning the knob in either direction, for instance, in radio tuners this insures convenient location of the point of best signal reception. Automatic timing, on the other hand, is best performed by a motor shifting certain parts, such as the cores or other elements of a tuner, in one direction only; a return stroke being effected by a spring or the like. Compound clutch and control means are used to connect either the manual knob or the automatic motor to the device, while the return spring usually can have permanent connection with the device to be shifted. In tuners, it is further usual to provide for normal engagement of the manual tuning clutch; that is, to provide electric disengagement of the manual clutch and electric engagement of the motor clutch, both at the start of the automatic operation and during the automatic tuning. One of the above mentioned difficulties of prior tuning apparatus was connected with the fact that the driver or some passenger—for instance, a child riding in the car—sometimes attempted after an automatic return stroke of the tuner to turn the manual tuning knob beyond the zero position of the tuning elements. Of course, it was possible to protect the latter elements from damage; however, it was less easy to avoid injury to the mechanical control parts. Those latter parts desirably are light and sensitive; some of them are easily damaged by faulty manual operation of such kind as mentioned. A similar difficulty can arise for other reasons; for instance, when electric motor connections are accidentally reversed in shop testing, repair or similar operations.

A general object of this invention is to avoid the abovementioned difficulties.

Another object of the invention is to provide motion conversion apparatus, particularly automatic tuning apparatus, which normally allows bi-directional manual shifting of certain elements but allows only uni-directional manual shifting of such elements when they are in a certain position; particularly in the starting or low frequency position of tuner elements. The automatic motor shifting, as mentioned, is also uni-directional; with regard to the motor shifting, this feature applies throughout the operation of the device, whereas it applies to the manual shifting only in the position referred to.

A further object is to make sure that the means for selective bi-directional and uni-directional, manual and automatic, operations allow fine and accurate control over the shifting of an element such as a radio tuner.

Still another object is so to provide that said combined means allow a rapid, practically instantaneous return stroke of the mechanism at the end of an operating stroke; that is, at the moment when an ultimate, predetermined position of the device has been reached.

An important feature of the present apparatus, briefly described, consists in the combination of means for selectively connecting a driven member to a drive member for the same and disconnecting it therefrom, said means comprising a rotatable element, such as a gear, in mesh or other suitable engagement with said drive member; a ratchet rotatable with said element for preventing its normal rotation; a pawl for normal one-way locking engagement with the ratchet means; and means for disengagement of the pawl and ratchet at one end of an operating stroke and during the return stroke.

A more particular feature is that the means for disengagement of the pawl and ratchet during the return stroke comprises ratchet tooth means so dimensioned that rotation of the ratchet and gear during the return stroke causes no re-engagement of the ratchet and pawl. Desirably, the latter re-engagement is caused only by a brief, initial, manual or automatic operation of the drive means, in the direction of the operating stroke.

Further objects, features and advantages of the invention may become apparent from the following description, together with the appended drawing, wherein.

Figure 2:
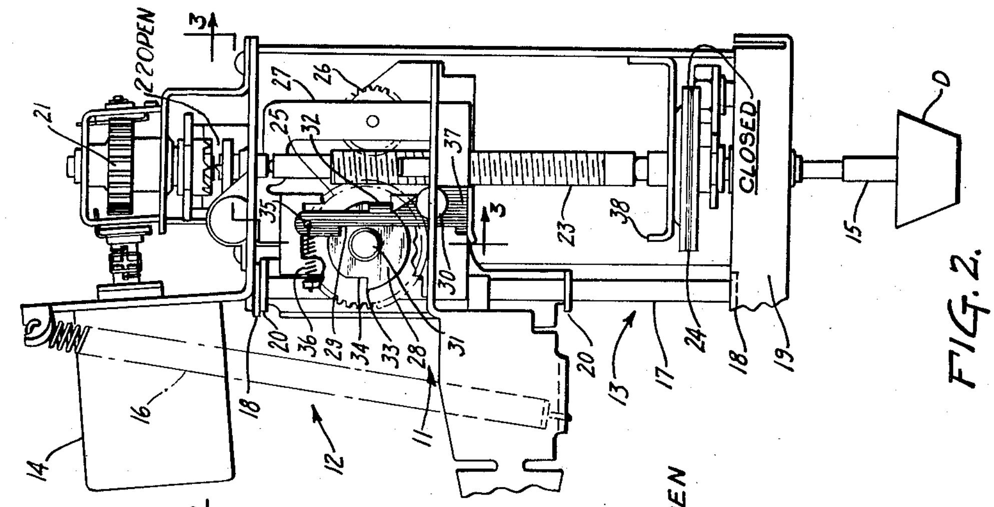
Figure 2 is a similar view showing another position of a device.
Figures 1, 3:
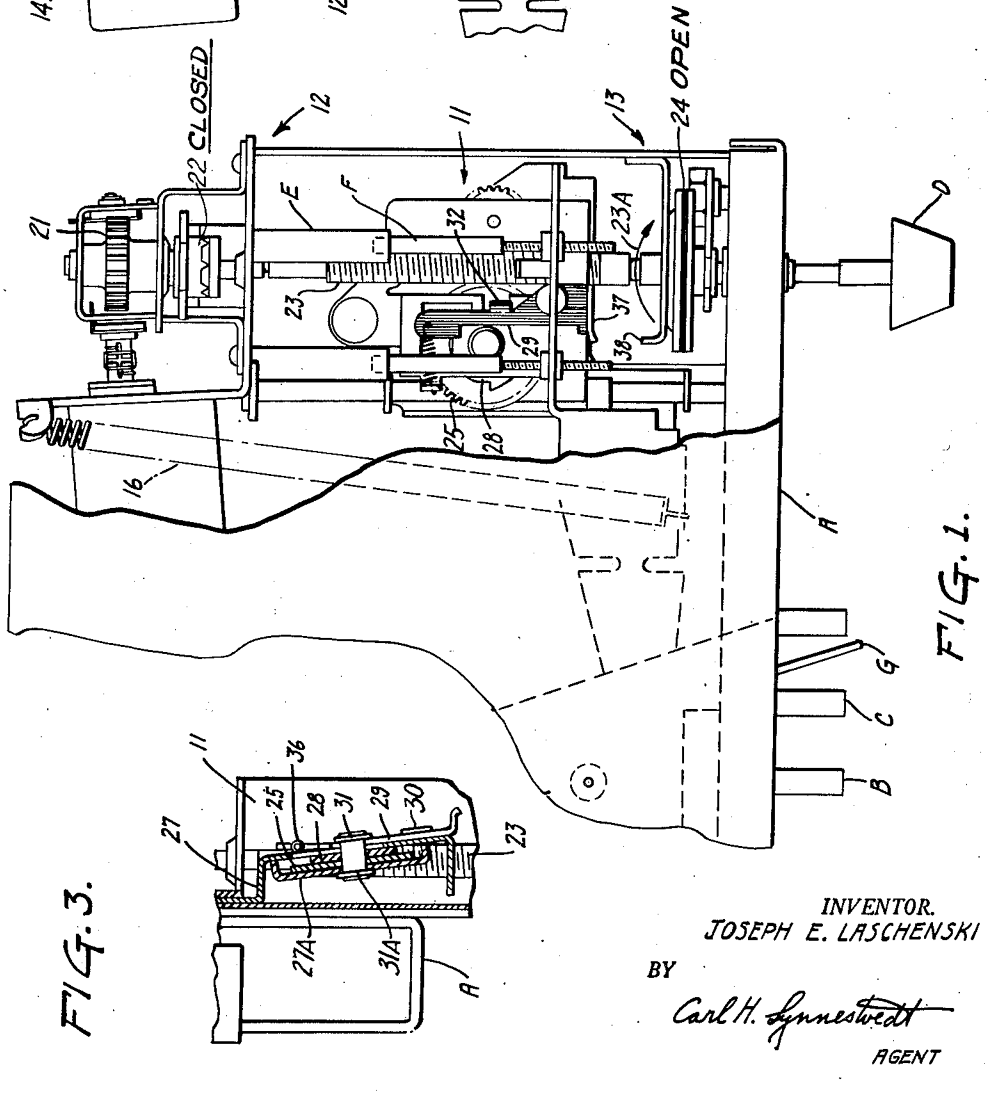
Figure 1 is a plan view showing one position of a tuning device embodying the mechanism of this invention.
Figure 3 is a view taken along line 3—3 of Figure 2.
Figure 6:
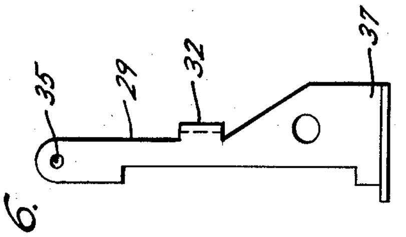
Figure 9:
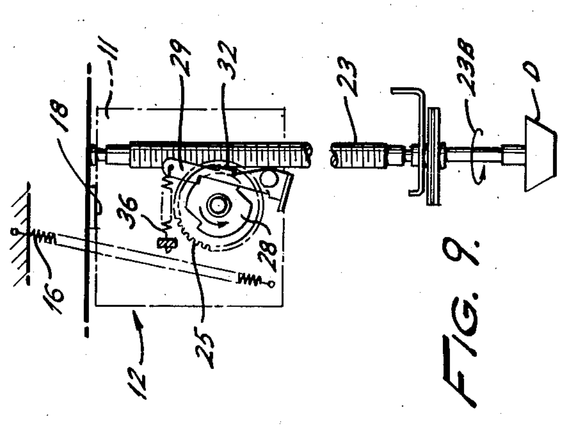
Figure 5:
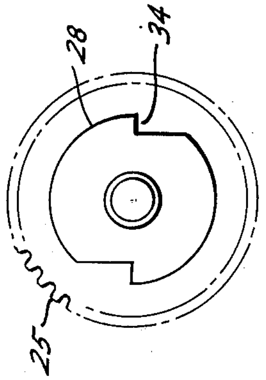
Figure 8:
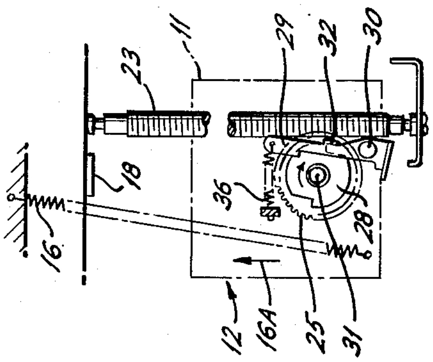
Figure 4:
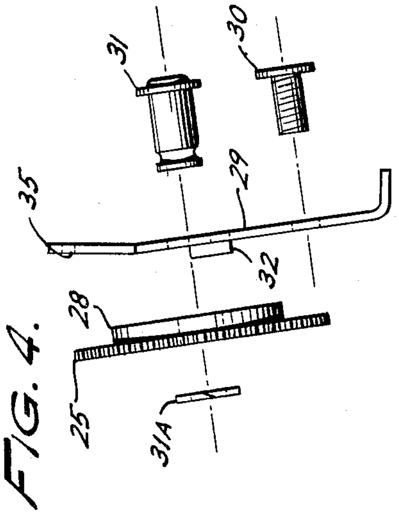
Figure 4 is an exploded version of the principal part of Figure 3.
Figure 7:
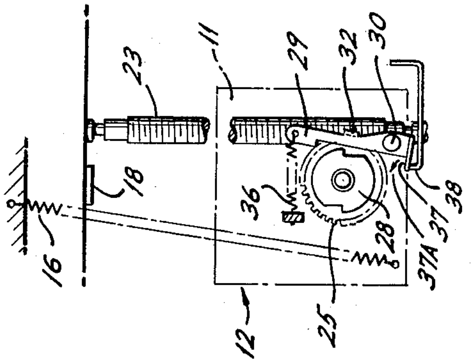

Figures 5 and 6 are separate front views of the principal parts of Figure 4; and Figures 7, 8 and 9 are motion diagrams showing the apparatus in views generally similar to those of Figures 1 and 2 but in different positions.

Referring first to Figure 1, the motion converter or tuner comprises a main chassis or frame A, at the front of which there are provided push button means B, C, etc., and a manual drive or tuning knob D.

Automatic tuning can be initiated by momentary manual depression of a push button, such as B or C. Thereupon the tuner, by well known means, not shown, automatically scans a predetermined range of signal frequencies and/or other signal characteristics. Mechanically, this automatic scanning is performed by a motor drive which causes relative shifting of tuner elements, for instance, shifting of cores E relative to coils F. When the predetermined type of signal is received, an electric receiver circuit, not shown, interrupts the operation of the motor. The receiver has then been tuned to the signal in question and the position reached thereby is shown by an indicator G.

In order to provide for this automatic operation in accordance with this invention, the tuner comprises a tuner carriage or core carriage 11 for moving the cores E, the motion as illustrated being straight-line. Tuning strokes of the carriage 11 are performed in one direction, as shown from a back or low frequency portion 12 of the apparatus to a front or high frequency portion 13. Such tuning strokes can be performed automatically by means of a motor 14 or manually by a shaft 15 secured to the knob D. The knob can also shift the carriage in the opposite direction. An automatic return stroke of the carriage from position 13 to 12 is performed by means of a return motor means, shown as a spring 16, whenever the carriage has—automatically or manually—reached a certain position near the front 13. The spring 16 is anchored to the chassis A and connected to the carriage 11 so as to permanently bias the carriage toward its back or low frequency position 12.

Referring now to Figure 2, a straight guide-rod 17 guides the core carriage 11 in the performance of the various strokes. This rod is shown as rigidly held in ears 18 of a frame 19, said frame forming part of the chassis A. The core carriage 11 engages the guide rod 17 by means of ears 20 suitably formed on said carriage.

In order to propel the core carriage along said guide rod during the tuning strokes, the motor 14 operates gearing 21 and motor clutch means 22, whereby it drives a transmission drive element, shown as a threaded spindle or elongated worm 23 which extends parallel to the guide rod 17. However, the spindle 23 may also be rotated by the knob shaft 15, through the intermediary of a hand drive clutch 24. In either case, a transmission follower or driven element, shown as gear 25, mounted upon the core carriage 11, engages the threads of the spindle 23. Provision is made to hold this gear in fixed position relative to the carriage 11 during the tuning strokes, but to hold it rotatably during the return strokes and also during possible manual overriding return movements of the knob shaft 15 and spindle 23. This provision constitutes an important safety feature in the combined motor and hand controlled tuning and spring actuated return of the core carriage. The details will appear shortly hereinafter.

Desirably, a back-up gear 26 is provided, engaging the spindle or worm 23 at a location diametrically opposite the engagement area of the control gear 25. The two gears 25, 26 are mounted in a small gear frame 27 on carriage 11 at a fixed distance from one another, allowing only a small degree of play laterally of the worm 23; thereby making it possible to provide close and safe meshing between the worm and gears even when the pitch of the worm and gears is such as to make the teeth and threads very small. This feature, in combination with the motion conversion now to be described, safeguards fine and accurate tuning, free from mechanical interference by vibrations of the automobile.

In order to establish the alternately fixed and rotatable conditions of the control gear 25, said gear is provided with selective holder and release means, by coaxially and rigidly connecting it with a cam or ratchet 28 which cooperates with a movable lock lever or pawl 29. The pawl is shown as a lever swingable in a plane parallel with that of the gear and cam. The pawl is connected with the frame 27 by a pivot 30, in front of a journal 31 connecting the gear 25 with the same frame. The pawl extends backwardly from its pivot 30 in a direction generally tangential of the ratchet 28 and a short distance beyond the ratchet. The pawl has a ratchet engaging part 32, shown as a finger tab detent depending from the body of the pawl. The ratchet is shown as having two teeth 33 spaced by one hundred eighty degrees and two recesses 34 between the teeth. Adjacent the teeth, these recesses are shaped to match the form of the detent 32, or vice versa, both being shown as having flat surfaces in contact with one another. The back end of the pawl 29 has a drilled hole 35 for one end of an extension spring 36; the other end of the spring being suitably anchored to the pawl and gear holder frame 27, so as to permanently urge the pawl detent toward the ratchet.

As best shown in Figure 3, the structure shifted by the present motion converter, comprising the core carriage 11 and the gear frame 27 thereon, supports not only the gear 25 but also, coaxially therewith, the ratchet 28 and gear and ratchet pivot 31, the latter having a snap ring 31A behind a frame element 27A. The functional cooperation of said gear and ratchet with pawl 29 will be clear from Figure 4, wherein they are shown in an exploded end view, and from Figures 5 and 6, wherein the principal parts 25, 28, 29 are shown in front view.

In the embodiment shown in Figure 2, the ratchet has two teeth; in this case the stroke length of carriage 11 and the dimensions of the spindle and gear teeth are so proportioned that the control gear and ratchet, when free to rotate, make one-half of a complete turn plus a small override such as the length of one gear tooth. However, it is also possible to use a slightly modified mechanism according to this invention, wherein the ratchet has only a single tooth. In that case, the spindle 23 and the gear 25 must be dimensioned so as to provide at least one complete turn of the gear during the return stroke. It is likewise possible to provide three or more ratchet teeth; in that modification the spindle and the gear should provide a corresponding fraction of a turn of the gear during the return stroke. It is, however, preferred to make the number of teeth in the ratchet fairly small. The reason is that a large number of teeth in the ratchet, such as ten teeth, would require an arrangement wherein the ratchet makes only a small fraction of a complete turn, such as one-tenth of a turn, during a complete return stroke; and such a small stroke could not easily be employed for control purposes with any appreciable accuracy. It would be possible to overcome this difficulty by added gearing, but this would add undesirably to the complexity of the device. Thus it appears that provision of one, two or three equally spaced teeth, in the ratchet 25, is preferable.

Attention must now be drawn to a pawl release mechanism, which as shown in Figure 2 may comprise a release lever 37 integral with the front part of pawl 28. An actuator for this release lever is provided in the form of a stationary finger 38, incorporated in the base 19 adjacent the front or high frequency end 13 of the operating strokes of the carriage. The release actuator finger 38 is adapted to disengage the pawl detent 32 from a sprocket recess 33 when and as the core carriage reaches the front end of a tuning stroke.

The gears 25, 26 are shown in Figures 2 and 3 as plain spur gears, inclined so that they can cooperate with the spindle 23 in the manner in which a worm gear meshes with the worm. Similarly, the motor 14 is shown as being inclined relative to the spindle 23 so that a worm on the motor shaft can drive an ordinary spur gear on the drive shaft of the motor clutch. The bearings and connections of spindle 23 and other parts can be made free-running and to some extent even loose, as is well-known in the art of instrument design. The gear frame 27 is shown as being pivoted to the core carriage 11, in order to compensate for lack of proper orientation and/or straightness in the spindle 23.

The automatic operation of the device has already been described above in general outline. With respect to the present mechanism (Figure 1), this operation comprises rotation of the drive shaft of the clutch 22 by the motor gearing 21 in the direction of arrow 23A. The clutch 22 is electrically engaged and the manual clutch 24 disengaged by a suitable solenoid or the like, not shown, whereupon it rotates the spindle 23 in said direction. The control gear 25 is locked against rotation, by engagement between the pawl detent 32 and ratchet 28. Thus the teeth of the gear 25 which happen to be in engagement with the worm 23 act as a worm follower or dog, whereby the gear frame 27, the core carriage 11 and the cores thereon are shifted along the guide rod 17. Such shifting modifies the tuning of the above mentioned tuning circuits. If and when this operation has tuned the receiver to a predetermined frequency and selected by depression of a push button such as B or C—the automatic motor operation is interrupted by electrical control means, not shown. On the other hand, if no signal of the type required by the push button operation is received, the tuning operation continues until the front or high frequency position is reached.

At that point (Figure 7), the pawl release lever 37 contacts the stationary finger 38; the levers 37, 29 rock in a clockwise direction 37A about their pivot 30, against the resistance of the spring 36; the detent 32 leaves the ratchet recess 34 which it previously engaged; the ratchet and gear 28, 25 are now free to rotate; and the return spring 16—previously tensioned by the tuning stroke—snaps the tuning carriage, together with the various parts thereon, back to the low frequency position. During this return stroke 16A (Figure 8), effected by spring 16 the gear 25 and ratchet 28 rotate clockwise on their journal 31 due to the engagement of gear 25 and spindle 23 and the pawl detent 32 rides on the surface of the two point ratchet or cam 28.

When the carriage has reached a position slightly in front of the back or low frequency end 12, the detent 32 snaps into the second ratchet recess 34, due to the forces of the spring 36 (Figure 2). As mentioned before, the return stroke is desirably extended a slight distance beyond this position; this is done in order to make sure that the snap-in position is safely established.

Throughout the automatic tuning operation engagement between the pawl detent 32 and the adjacent ratchet tooth 33 is established (Figure 1); the power of the motor 14 being applied to turn the spindle 23 in such a direction 23A as to tend to rotate gear 25 and ratchet 28 against the pawl detent 32. At the start of the automatic return stroke (Figure 7), the engagement of ratchet and pawl is broken (Figure 8); and it remains broken until the end of that stroke (Figure 2), since the stroke, as mentioned, coincides with the passage of the back of only one ratchet tooth under the pawl detent 11.

During the automatic operation (Figure 1), the manual tuning knob is incapacitated, since the manual clutch is open. At all other times, manual tuning can be employed. It may start either at the back position or at any other position of the tuner (Figures 1, 2, 8, etc.). From such position the tuning carriage is shifted either forward or backward by operation of knob D. Such operation can continue so long as said carriage is located at any point other than the back or low frequency position 12. Throughout the manual shifting operation, the pawl and ratchet 28, 29 engage one another in substantially the same manner as they do during forward automatic shifting. Referring particularly to the backward, manual shifting of the tuner—in areas other than the back position 12—the pawl and ratchet are engaged during such operation as well as during forward shifting. However, at this time the mutual engagement of the parts is largely due to the fact that the return spring 16 tends to press the back surfaces of successive teeth of rotating gear 25 against front surfaces of threads in stationary spindle 23. This tends to produce the same ratchet and pawl action which is produced, during forward shifting by the action of the motor or knob which tends to press the front surfaces of threads in rotating spindle 23 against the back surfaces of teeth in stationary gear 25.

Additionally, the locking engagement of ratchet and pawl during manual operation can be promoted by the design of the ratchet and pawl mechanism itself (Figures 5 and 6). This design can be such that pressure is applied by the pawl to the ratchet with at least a slight non-radial component; the pawl itself tending to rotate the ratchet through a small angle, while maintaining engagement therewith. Such provision is conveniently made by including an angle of more than 90 degrees between the two lines from detent 32 to journal 31 and from detent 32 to pivot 30 (Figure 1).

At one further time the locking engagement of ratchet and pawl is incapacitated according to this invention. The purpose is that inadvertent operation of the knob D should not "force" or injure the mechanical parts when either the back or front stops 12 or 13 have been reached by the carriage 11. At the front position 13, forcing of spindle threads or meshing gear teeth or other parts, due to continued forward shifting of the carriage, is avoided by the trip mechanism 37, 38 which causes the carriage to snap back to point 12. At the latter point (Figure 9), there exists a danger of injury to the mechanical parts, inasmuch as further backward shifting of the core carriage, by the knob D in direction 23B, may be attempted. The possibility of injury is safely avoided by the ability of the ratchet 28 to idle past the pawl 29. Such idling is the only result of any attempt to force the core carriage backwards beyond the back or low frequency position. The minute force of the pawl spring 36 is easily overcome.

While only a single embodiment of the invention has been described in detail, it should be understood that the details thereof are not to be construed as limitative of the invention excepting insofar as set forth in the following claims.

I claim:

1. Motion converting apparatus for shifting a structure in a direction from a first stop to a second stop by combined shifting motor and transmission drive means, for then shifting the structure in the opposite direction by return motor means and for optionally shifting the structure by manual means and said transmission drive means in either direction, said apparatus comprising transmission follower means carried by the structure in engagement with the transmission drive means; holder and release means adapted to hold the transmission follower means so that the shifting motor as well as the manual means can shift the structure, said holder and release means being adapted also to release the transmission follower means; a device for controlling said holder and release means in such manner that, regardless of said engagement of the transmission drive and transmission follower means, the return motor means can return the structure from the second stop to the first stop; and means, including part of said device and adapted to control said holder and release means in such manner that the transmission drive means cannot urge the structure beyond the first stop.

2. Apparatus for automatically shifting a tuning element in a direction from a first toward a second stop, for then automatically returning the element in the opposite direction and for optionally manually shifting the element in either direction, comprising a carriage for the tuning element; a threaded spindle; motor means for rotating the spindle; manually operable means for rotating the spindle; gear means on the carriage engaging the spindle; gear lock means comprising a ratchet secured to the gear means and a pawl pivoted to the carriage and biased for engagement with the ratchet, in order to lock the gear means against rotation in one rotational direction thereof; means for permanently urging the carriage toward the first stop; and means for momentarily rendering the gear lock means inoperable.

3. Apparatus as described in claim 2 wherein the ratchet is coaxially secured to the gear means.

4. Apparatus as described in claim 3 wherein the gear means and ratchet are adapted to rotate through a predetermined number of degrees when the carriage, with the gear lock means inoperable, moves from the second stop to the first; the ratchet being recessed over a similar number of degrees.

5. Apparatus as described in claim 4 wherein the ratchet has two teeth, spaced apart by 180 degrees; the gear means being adapted to rotate slightly more than 180 degrees when moving with the carriage, and with the gear lock means inoperable, from the second stop to the first.

References Cited in the file of this patent

UNITED STATES PATENTS 2,512,714 Carlzen ______________ June 27, 1950